United States Patent [19]

Bress et al.

[11] Patent Number: 5,570,420

[45] Date of Patent: Oct. 29, 1996

[54] CUSTOMER PREMISE EQUIPMENT NETWORK INTEGRATOR

[75] Inventors: James R. Bress, Neptune; Barry K. Schwartz, Stockton, both of N.J.

[73] Assignee: Bell Communications Research, Inc., Morristown, N.J.

[21] Appl. No.: 204,106

[22] Filed: Mar. 1, 1994

[51] Int. Cl.$^6$ .................................................. H04M 7/06
[52] U.S. Cl. .......................... 379/220; 379/221; 379/376
[58] Field of Search .................................... 379/376, 377, 379/386, 396, 201, 207, 164, 221, 211, 205, 219, 220

[56] References Cited

U.S. PATENT DOCUMENTS

| | | | |
|---|---|---|---|
| 4,653,094 | 3/1987 | Rasmussen | 379/396 |
| 4,873,717 | 10/1989 | Davidson | 379/157 |
| 4,924,493 | 8/1990 | Dang | 379/94 |
| 4,935,958 | 6/1990 | Morganstein | 379/372 |
| 4,979,118 | 12/1990 | Kheradpir | 379/221 |
| 5,046,088 | 9/1991 | Margulies | 379/211 |

OTHER PUBLICATIONS

B. K. Schwartz, "Right before your eyes", *Bellcore Exchange* Sep./Oct. 1992 pp. 16–19.
B. K. Schwartz, "The Analog Display Services Interface, "*IEEE Communications Magazine*, Apr. 1993, pp. 70–75.

*Primary Examiner*—Jeffery Hofsass
*Assistant Examiner*—Thomas F. Presson
*Attorney, Agent, or Firm*—Leonard Charles Suchyta; James W. Falk

[57] ABSTRACT

A customer premise equipment (CPE) network integrator (CNI) (20) is connected to today's integrated telephone network to provide additional and improved telephone services. The CNI (20) is connected between a CPE (10) and a network switch (30) and is connected to an STP (40). The CNI (20) detects existing inband call progress network tones, such as dial tone, busy, audible ringback, etc. and a variety of local CPE events, such as offhook, onhook, etc. and uses these tones and events to infer a change in network state. In response to certain network state changes, the CNI (20) queries a network service control point (SCP) (50) and requests call processing information. In response to the call processing information from the SCP (50), the CNI (20) processes the phone call. Because the CNI (20) can infer changes in network states from inband call progress network tones and local CPE events, the CNI (20) can bypass the network switch (30). This configuration allows implementation of AIN telephone services in today's integrated network.

20 Claims, 3 Drawing Sheets

CUSTOMER PREMISE EQUIPMENT NETWORK INTEGRATOR

BACKGROUND OF THE INVENTION

The present invention relates generally to the field of telephone services, and more specifically to adding services to the existing telephone network.

Today's telephone network is moving from an intelligent network ("IN") to an Advanced Intelligent Network ("AIN"). The IN has for many years comprised network switches, a database (generally called a Service Control Point ("SCP")), which contains information used to route or otherwise handle a specific telephone call, Common Channel Signaling System 7 ("CCS7") links between the network switches and the external database, and service specific logic, which causes the switches to query the database for call processing instructions.

The AIN will provide a more intelligent and flexible telephone network, as well as a broader range of telephone services. Generally, the AIN will comprise the same elements as the IN. However, rather than requiring service specific logic in the switches to trigger queries to the SCP, AIN switches (or Service Switching Points ("SSPs")) will trigger on generic network events such as a terminating line busy indication, an originating line off-hook indication, dialed digits collected by the SSP, etc.

Implementation of the AIN is an extremely costly and time-consuming process. Some of the major problems to the widespread and rapid implementation of AIN are faced by the switch vendors, which must rework old switches and develop new switches to recognize and respond to a larger variety of event triggers and changes in the network state. Fundamentally, these switches must detect event triggers or changes in the network state, suspend call processing, issue a query to an external database, and then continue call processing in response to and in accordance with instructions from the external database. High demands on network component providers and software providers for error-free call processing have also slowed the implementation of the AIN.

Although the AIN will go a long way toward improving the flexibility and scope of telephone services, it too will have limitations and deficiencies. The following example helps illustrate the deficiencies of the network as it presently exists and as it may exist as AIN.

Many business people want to record telephone conversations. In today's network, a user must record the conversation off a telephone loudspeaker or via a recorder built into the telephone unit. The network itself does not permit a customer to record a message and does not recognize any triggers which would allow such a service to be implemented. The expanded trigger recognition of the AIN may allow the implementation of such a service; however, this implementation has not yet been proposed, and it is not yet clear whether necessary triggers or state changes will be recognized in the AIN.

Apart from recognizing trigger events or network states, some network components have been proposed which detect certain call events or tones and infer network states therefrom. Bellcore, for example, has proposed a prototype screen telephone and a network integrator for this purpose. The network integrator or Customer Premise Equipment ("CPE") network integrator ("CNI") detects existing in-band call progress tones, such as dial tone, busy, audible ringback, etc. and a variety of local CPE events, such as off-hook, on-hook, etc. The CNI uses these tones and events to infer a change in network state. A network state change invokes a program in the CPE, which provides an appropriate screen display and defines a set of user-accessible soft keys. The soft keys, when pressed, invoke macros, which provide for a variety of network services. The following example helps illustrate the operation of the CNI.

Assume an originating party ("OP") dials the number of a terminating party ("TP"), whose phone is busy. The OP hears a busy signal. At the same time, the CNI detects the busy signal, displays the message "Party Busy," and labels a soft key "Keep Trying." If the OP presses that soft key, the CNI disconnects from the TP busy signal (goes on-hook for longer than 1550 ms), listens for and detects dial tone, and outpulses the CLASS™ Automatic Recall activation code (*66). The CNI then displays the message: "Keep Trying Activated. The phone will ring distinctively when NXXXXXX no longer busy." The CNI then updates a "Keep Trying" management list and displays a normal on-hook menu. When the TP's line becomes idle, as determined by existing common channel signaling query/response messages, the network distinctively rings the OP's CPE and delivers the TP caller ID (between the first and second power ringing cycles). The CNI displays the message "NXXXXXX Reached," and, if the OP goes off-hook, the network completes the call. The CNI then deletes the TP number from the "Keep Trying" management list.

In summary, the CNI detects call events or tones, infers a network state, and uses that inference locally at the CPE to display a variety of network services available to the caller. The CNI is useful because it can infer network states from in-band call progress tones. However, its functionality has been limited to local programming of an associated CPE.

Accordingly, it is desirable to provide a telecommunication network device which can make available AIN services in today's existing network.

It is also desirable to provide a telecommunications network in which new telephone services can be installed and implemented efficiently and quickly.

It is also desirable to provide network interface equipment which can enhance telecommunication services and bypass the need for additional changes to network switches.

Additional desires of the invention will be set forth in the description which follows, and in part will be apparent from the description or may be learned by practice of the invention. The advantages of the invention may be realized and obtained by means of the instrumentalities and combinations particularly pointed out in the appended claims.

DISCLOSURE OF THE INVENTION

To achieve the foregoing desires and objects, and in accordance with the purposes of the invention as embodied and broadly described herein, the present invention provides a telephone network, comprising customer premises equipment ("CPE"), a switch, a service transfer point ("STP") connected to the switch, a service control point ("SCP") connected to the STP, and a CPE network integrator ("CNI") connected to the CPE, the switch, and the STP. The CNI includes means for detecting network call progress tones, means for detecting local CPE events, means for inferring a network state from the network call progress tones and local CPE events, and means for processing a telephone call based on an inferred network state.

BRIEF DESCRIPTION OF THE DRAWINGS

The accompanying drawings, which are incorporated in and constitute a part of the specification, illustrate presently-preferred implementations of this invention and, together with the general description given above and the detailed description of the preferred implementations given below, serve to explain the principles of the invention.

In the drawings.

BEST MODE FOR CARRYING OUT THE INVENTION

Figure 1:
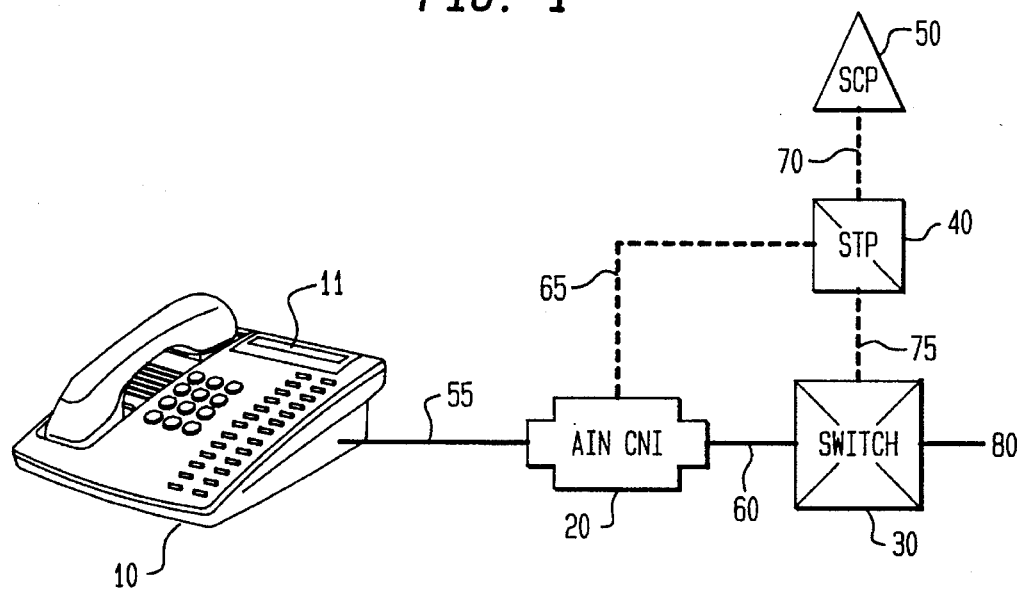
FIG. 1 is a block diagram of an AIN CNI architecture, in accordance with one embodiment of the present invention.

Reference will now be made in detail to the construction and operation of the preferred implementations of the present invention, which are illustrated in the accompanying drawings. In the drawings, like elements and operations are designated by like reference numerals. The following description of the preferred implementations is exemplary and does not limit the invention to these specific implementations.

In accordance with the present invention, an intelligent CNI is integrated into today's IN to provide added intelligence and functionality equal to or exceeding that expected for AIN. Accordingly, the intelligent CNI of the present invention is referred to herein as the AIN CNI.

As shown in FIG. 1, the network architecture of the present invention preferably comprises CPE 10, AIN CNI 20, switch 30, STP 40, and SCP 50. AIN CNI 20 is connected to CPE 10 by conventional voice line 55, which may also carry data in accordance with conventional techniques. AIN CNI 20 is connected to switch 30 by voice line 60 and is also connected to STP 40 by data line 65. STP 40 is connected to SCP 50 and switch 30 by data lines 70 and 75, respectively. Switch 30 is connected to the rest of the network (not shown) by voice line 80.

Switch 30 preferably comprises an existing IN switch, but may alternatively comprise an AIN switch or a partial AIN switch. STP 40 preferably comprises an existing CCS SS7 data switch. SCP 50 preferably comprises an existing IN SCP. Alternatively, SCP 50 may comprise an integrated service control point ("ISCP") enhanced with Bellcore's SPACE® and MSAP® applications and corresponding call processing records. Such an ISCP is described more fully in Man et al U.S. patent application Ser. No. 07/972,817, now U.S. Pat. No. 5,450,480, Sep. 12, 1995, and Nazif et al U.S. patent application Ser. No. 07/972,529, now abandoned but a continuation of which is now U.S. Pat. No. 5,481,601, Jan. 1, 1996. Both of these applications are hereby incorporated by reference. Data connections 65, 70, and 75 preferably comprise conventional data to SS7 out-of-band signaling network channels.

In a preferred embodiment, CPE 10 comprises a screen phone having both conventional touch-tone telephone capabilities and a display 11. CPE 10 displays self-generated information or information sent to the CPE by a remote server. In the AIN environment of the present invention, the CPE preferably displays various customer options for turning AIN services on or off and for setting AIN service parameter values.

Figure 2:
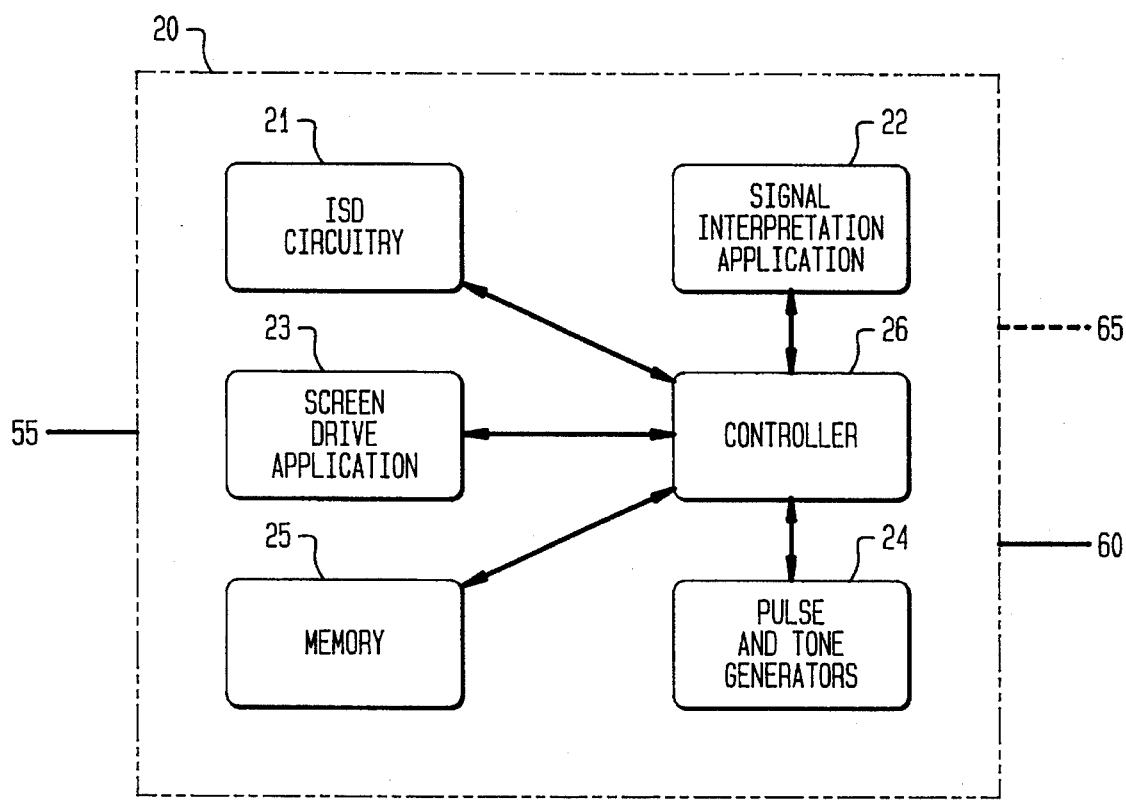
FIG. 2 is a block diagram of an AIN CNI, in accordance with one embodiment of the present invention.

FIG. 2 shows a block diagram of AIN CNI 20 in accordance with one embodiment of the present invention. As shown, AIN CNI 20 preferably includes inband signal detection ("ISD") circuitry 21, signal interpretation application 22, screen drive application 23, pulse and tone generators 24, memory 25, and controller 26. Controller 26 is connected to and interfaces with each of the ISD circuitry 21, signal interpretation application 22, signal drive application 23, pulse and tone generators 24, and memory 25.

The ISD circuitry 21 detects call progress network tones (e.g., dial tone, busy, audible ringback, call waiting, etc.) and local CPE events (e.g., off-hook, on-hook, dtmf key presses, etc.) and passes that detection to the controller 26. Controller 26 then executes the signal interpretation application 22 to interpret what the event means by inferring a network state based on the current event and knowledge of the recent history of CPE events, which is stored in memory 25. After determining what the event means, signal interpretation application 22 instructs controller 26 on how to respond to the event. For example, signal interpretation application 22 might instruct controller 26 to send a state change notice out over the data channel 65 to the STP for possible action from an AIN service or it might instruct controller 26 to display certain information. Alternatively, signal interpretation application might instruct controller 26 to cause the pulse and tone generators 24 to send out a sequence of dtmf signals over the network voice channel 60 to the switch to provide signaling.

The following example helps illustrate the operation and processing technique of the present invention. As mentioned in the Background section, many business people like to record telephone conversations, but cannot do so using existing network components. The AIN CNI 20 and corresponding network architecture of the present invention enable calls to be recorded by the network.

Figure 3:
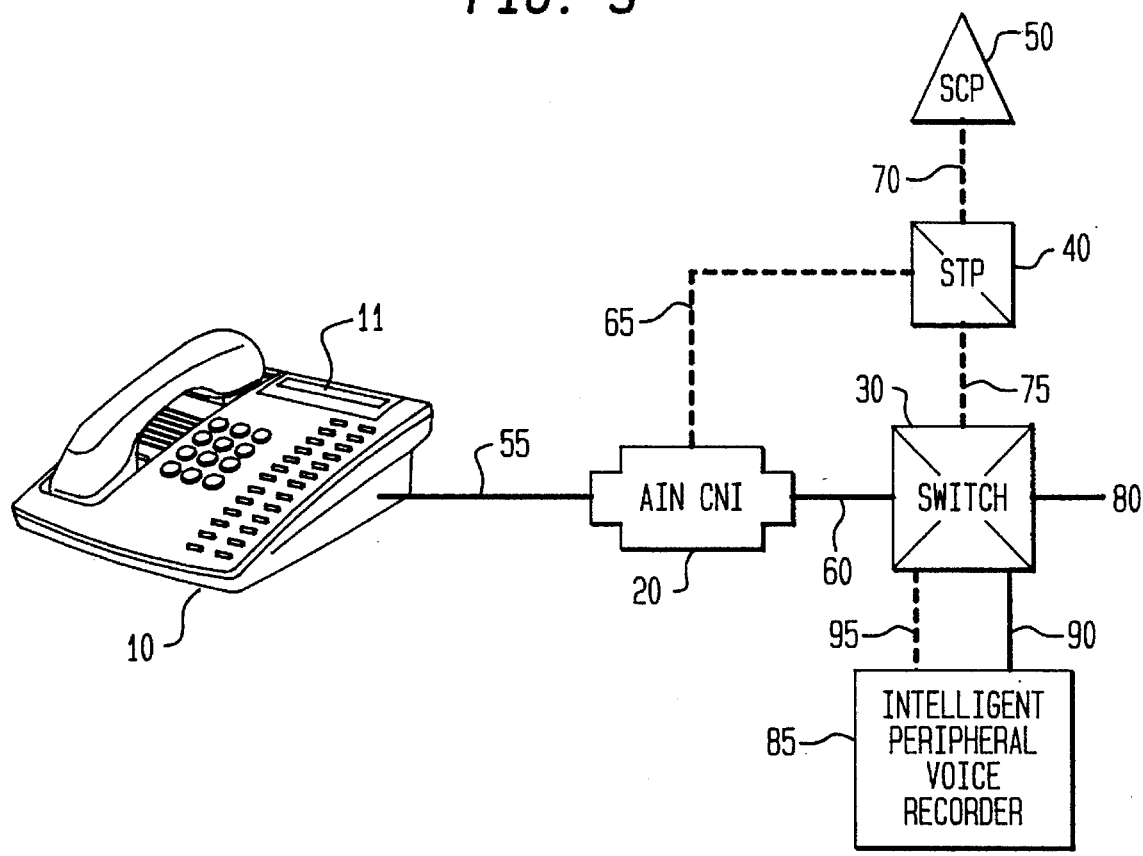
FIG. 3 is a block diagram of an AIN CNI architecture configured to provide a call recording service, in accordance with one embodiment of the present invention.

FIG. 3 shows the preferred network architecture of the present invention and includes an external network recording device necessary to provide this particular call recording service. The recording device is preferably an AIN intelligent peripheral voice recorder 85, provided to record and store voice conversations. It is connected to the network switch 30 with both voice link 90 and CCS7 data links 95. Preferably, the intelligent peripheral voice recorder 85 comprises equipment similar to conventional voice messaging systems.

Figure 5:
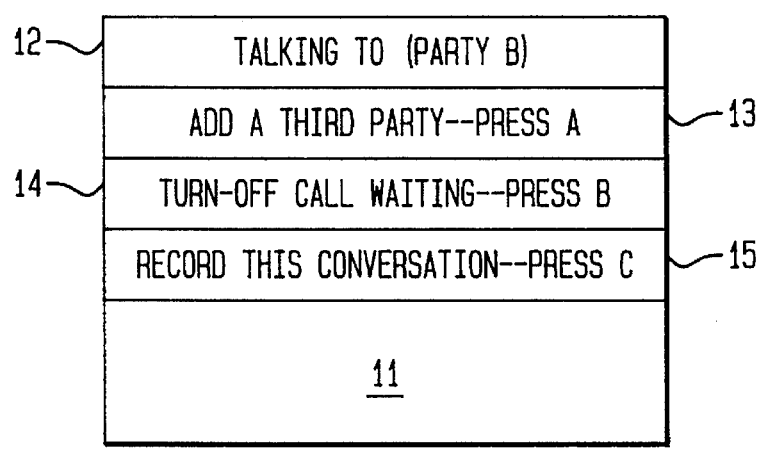
FIG. 5 is a diagram of a CPE display, in accordance with one embodiment of the present invention.
Figure 4:
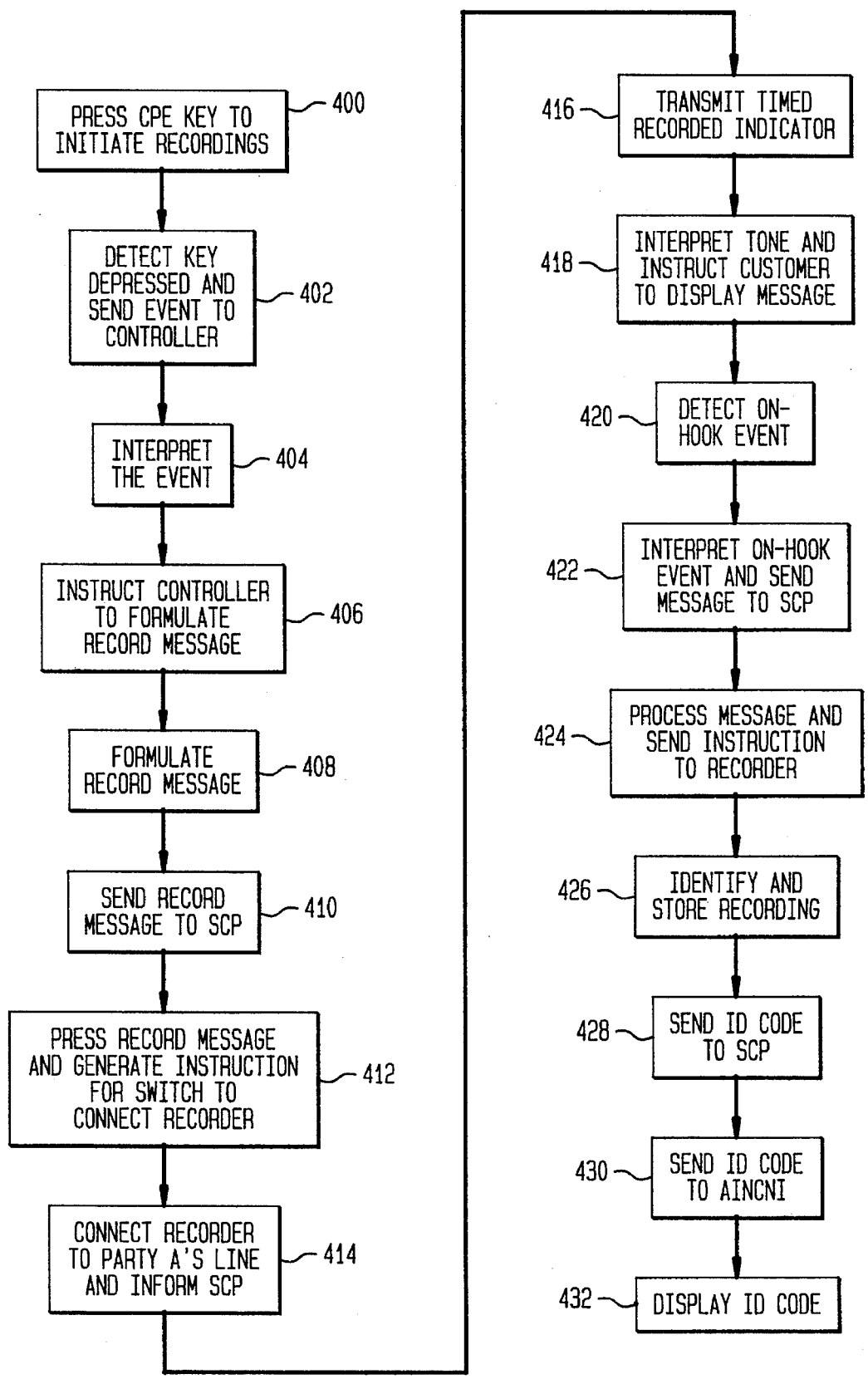
FIG. 4 is a flow diagram illustrating a call recording service processing, in accordance with one embodiment of the present invention.

The process for providing the call recording service will be described in accordance with the process flow diagram of FIG. 4. Assume for purposes of this example that party A has already established a conventional telephone call with party B. Moreover, assume that party A has an AIN CNI 20 associated with his CPE 10. Preferably, AIN CNI 20 is located at the CPE. However, in an alternative embodiment, AIN CNI 20 may be located at the switch 30. With this connection, AIN CNI 20 detects a stable call state and displays that state on display 11 of CPE 10. For example, as shown in FIG. 5, the stable call display may appear as: "TALKING TO (PARTY B)" 12, "ADD A THIRD PARTY - - - PRESS A" 13, "TURN CALL WAITING OFF - - - PRESS B" 14, and "RECORD THIS CONVERSATION - - - PRESS C" 15. Message 12 informs the caller of whom he or she is talking to, and messages 13, 14, and 15 list exemplary services available to the caller while in the stable call state.

For this example, in which party A wants to record the conversation, party A presses a key labelled C (not shown) on the CPE 10 (step 400). The ISD circuitry 21 in AIN CNI 20 sends a "C pressed" detection event to the controller 26 (step 402). Controller 26 then executes signal interpretation application 22 to interpret the detected event and to determine a correct response (step 404). Signal interpretation application 22 instructs the controller 26 to formulate a record message (step 406) and to send it via the SS7 data link 65 and STP 40 to an SCP 50 or ISCP (not shown) (step 408). The record message requests that a recording resource be assigned to this call and that the call be recorded.

The SCP 50 receives the record message, determines that a recording resource is available, and generates an instruction for the switch 30 (step 412). These steps are provided, for example, in accordance with the SCP operations as disclosed in the above incorporated U.S. patent application Ser. Nos. 07/972,817 and 07/972,529. In this example, the SCP instructs the switch 30 to connect the intelligent peripheral voice recorder 85 to party A's line by bridging the voice line 60 to the intelligent peripheral voice recorder 85 and to begin recording. Switch 30 makes the connection and informs SCP 50 that the connection is made and that recording has begun (step 414).

Intelligent peripheral voice recorder 85 preferably sends a recording indication tone to both party A and party B over voice lines 90, 60, and 80, in compliance with FCC regulations, as frequently as necessary (step 416). The ISD circuitry 21 in party A's AIN CNI 20 receives the recording indication tone and passes it to the controller 26. Controller 26 then executes the signal interpretation application 22 to interpret the tone. The signal interpretation application interprets the tone, recognizes it as a recording indication tone, and instructs controller 26 to display a message, such as "recording in progress" (step 418). Controller 26 executes screen drive application 23 to display the message. If party B is also equipped with an AIN CNI 20 and a CPE 10 with a display 11, party B's AIN CNI 20 would also recognize the recording indication tone and would display a similar message.

When party A concludes the conversation and hangs up, ISD circuitry 21 detects the "on-hook" event and sends this event to the controller 26 (step 420). Controller 26 executes the signal interpretation application to interpret the event. Signal interpretation application interprets the event and instructs the controller 26 to send a message to the SCP 50 to indicate the end of a call (step 422). SCP 50 receives the message, processes it, and sends a "stop recording" message to the intelligent peripheral voice recorder 85 via switch 30 (step 424). The intelligent peripheral voice recorder 85 stops recording, assigns an identification code to the recording, and stores the recorded message (step 426). The intelligent peripheral voice recorder then transmits the identification code to SCP 50 (step 428), which in turn transmits that code to party A's AIN CNI 20 via the SS7 data link 65 (step 430). Once controller 26 in party A's AIN CNI 20 receives the ID code, it executes screen drive application 23 to display the ID code on display 11 (step 432).

In the above example, CPE 11 preferably includes a display 11 to assist and inform the user. Alternatively, a CPE device 10 could be provided which does not include a display 11, but which nonetheless responds to instructions from the SCP 50. For example, the SCP 50 may send voice prompts to the caller, rather than information for display. Alternatively, the CPE may include a voice prompt device capable of translating instructions and information into voice prompts.

In accordance with the present invention, enhanced telephone services can be made available into today's IN quickly, without modifying the switches. The AIN CNI 20 preferably communicates directly with the SCP 50 to bring these enhanced services to the IN in an efficient and low cost manner.

While there has been illustrated and described what are at present considered to be preferred implementations and methods of the present invention, it will be understood by those skilled in the art that various changes and modifications may be made, and equivalence may be substituted for elements thereof without departing from the true scope of the invention.

In addition, many modifications may be made to adapt a particular element, technique, or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed:

1. A telephone network, comprising:
   customer premises equipment ("CPE");
   a switch;
   a service transfer point ("STP") connected to the switch;
   a service control point ("SCP") connected to the STP; and
   a CPE network integrator (CNI) connected to the CPE, the switch, and the STP, the CNI including:
      means for detecting network call progress tones;
      means for detecting local CPE events;
      means for inferring a network state from the network call progress tones and local CPE events; and
      means for processing a telephone call based on an inferred network state.

2. A telephone network, comprising:
   customer premises equipment ("CPE");
   a switch;
   a service transfer point ("STP") connected to the switch;
   a service control point ("SCP") connected to the STP; and
   a CPE network integrator (CNI) connected to the CPE, the switch, and the STP, the CNI including:
      means for detecting local CPE events;
      means for inferring a network state from the local CPE events; and
      means for processing a telephone call based on an inferred network state.

3. A telephone network, comprising:
   customer premises equipment ("CPE");
   a switch;
   a service transfer point ("STP") connected to the switch;
   a service control point ("SCP") connected to the STP; and
   a CPE network integrator (CNI) connected to the CPE, the switch, and the STP, the CNI including:
      means for detecting network call progress tones;
      means for inferring a network state from the network call progress tones; and
      means for processing a telephone call based on an inferred network state.

4. A telephone network according to claim 1, wherein said CPE includes a telephone.

5. A telephone network according to claim 1, wherein said CPE includes a telephone and a display.

6. A telephone network according to claim 1, wherein said CNI is connected to said CPE via a voice line.

7. A telephone network according to claim 1, wherein said CNI is connected to said switch via a voice line.

8. A telephone network according to claim 1, wherein said CNI is connected to said STP via a data line.

9. A telephone network, comprising:
customer premises equipment ("CPE");
a switch;
a service transfer point ("STP") connected to the switch;
a service control point ("SCP") connected to the STP; and
a CPE network integrator (CNI) connected to the CPE, the switch, and the STP, the CNI including:
  means for detecting network call progress tones;
  means for detecting local CPE events;
  means for inferring a network state from the network call progress tones and local CPE events; and
  means for sending a network state change notice to the STP in response to the inferred network state.

10. A telephone network, comprising:
customer premises equipment ("CPE");
a switch;
a service transfer point ("STP") connected to the switch;
a service control point ("SCP") connected to the STP; and
a CPE network integrator (CNI) connected to the CPE, the switch, and the STP, the CNI including:
  means for detecting network call progress tones;
  means for detecting local CPE events;
  means for inferring a network state from the network call progress tones and local CPE events; and
  means for informing a CPE user of the inferred network state.

11. A telephone network, comprising:
customer premises equipment ("CPE");
a switch;
a service transfer point ("STP") connected to the switch;
a service control point ("SCP") connected to the STP; and
a CPE network integrator (CNI) connected to the CPE, the switch, and the STP, the CNI including:
  means for detecting network call progress tones;
  means for detecting local CPE events;
  means for inferring a network state from the network call progress tones and local CPE events;
  means for transmitting dtmf signals to the switch in response to the inferred network state.

12. A telephone network according to claim 1, wherein said network call progress tones include dial tone, busy, audible ringback, call waiting tone, and recorder tone.

13. A telephone network according to claim 1, wherein said local CPE events include off-hook, on-hook, and dtmf key press events.

14. A telephone network, comprising:
customer premises equipment ("CPE");
a switch;
a service transfer point ("STP") connected to the switch;
a service control point ("SCP") connected to the STP; and
a CPE network integrator (CNI) connected to the CPE, the switch, and the STP, the CNI including:
  means for detecting network call progress tones;
  means for detecting local CPE events;
  means for inferring a network state from the network call progress tones and local CPE events; and
  means for displaying the inferred call state and selected call processing options on the CPE.

15. A telephone network according to claim 1, including means responsive to certain local CPE events for requesting call processing information from the SCP.

16. A method of controlling a customer premises equipment (CPE) network integrator (CNI) in a telephone network, the CNI being connected to a CPE, a network switch, and a network service control point, comprising the steps of:
detecting network call progress tones;
detecting local CPE events;
inferring a network state from the network call progress tones and local CPE events; and
processing a telephone call based on the inferred network state.

17. A method of controlling a customer premises equipment (CPE) network integrator (CNI) in a telephone network, the CNI being connected to a CPE, a network switch, and a network service control point, comprising the steps of:
detecting network call progress tones;
detecting local CPE events;
inferring a network state from the network call progress tones and local CPE events; and
sending a network state change notice to the SCP in response to the inferred network state.

18. A method of controlling a customer premises equipment (CPE) network integrator (CNI) in a telephone network, the CNI being connected to a CPE, a network switch, and a network service control point, comprising the steps of:
detecting network call progress tones;
detecting local CPE events;
inferring a network state from the network call progress tones and local CPE events; and
informing a CPE user of the inferred network state.

19. A method of controlling a customer premises equipment (CPE) network integrator (CNI) in a telephone network, the CNI being connected to a CPE, a network switch, and a network service control point, comprising the steps of:
detecting network call progress tones;
detecting local CPE events;
inferring a network state from the network call progress tones and local CPE events; and
transmitting dtmf signals to the switch in response to the inferred network state.

20. A method of controlling a customer premises equipment (CPE) network integrator (CNI) in a telephone network, the CNI being connected to a CPE, a network switch, and a network service control point, comprising the steps of:
detecting network call progress tones;
detecting local CPE events;
inferring a network state from the network call progress tones and local CPE events; and
displaying the inferred call state and selected call processing options on the CPE.

* * * * *